UNITED STATES PATENT OFFICE.

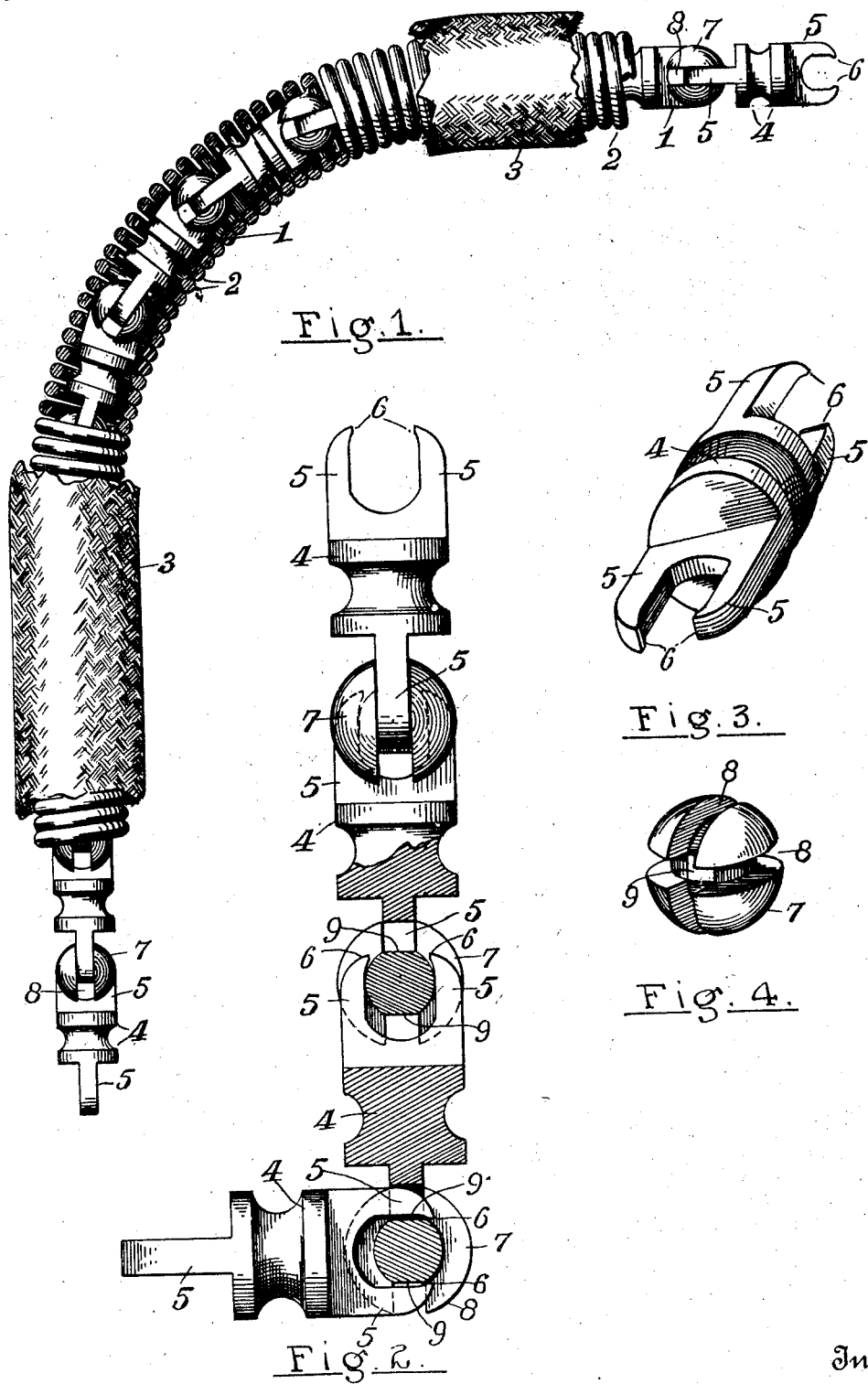

ARTHUR S. REED, OF GRAND RAPIDS, MICHIGAN, ASSIGNOR TO CHARLES E. RICHMOND AND CLARENCE C. TUXBURY, BOTH OF GRAND RAPIDS, MICHIGAN.

FLEXIBLE SHAFTING.

1,100,097.

Specification of Letters Patent. Patented June 16, 1914.

Application filed October 24, 1911. Serial No. 656,509.

*To all whom it may concern:*

Be it known that I, ARTHUR S. REED, a citizen of the United States of America, residing at Grand Rapids, in the county of Kent and State of Michigan, have invented certain new and useful Improvements in Flexible Shafting; and I do hereby declare the following to be a full, clear, and exact description of the invention, such as will enable others skilled in the art to which it appertains to make and use the same.

My invention relates to improvements in flexible shafting and its object is to provide a shaft which may be cheaply constructed, that will run smoothly when bent in a curve of a comparatively short radius and which may be easily and quickly assembled and disassembled for repair or other purposes, and to provide the device with various new and useful features hereinafter more fully described and particularly pointed out in the claim reference being had to the accompanying drawings, in which:—

Figure 1 is a view of a portion of a flexible shaft embodying my invention shown in elevation with parts broken away to disclose the interior construction; Fig. 2 is an enlarged detail partially in elevation and partially in section of a portion of the shaft proper removed from the casing; Fig. 3 is an enlarged perspective view of one of the link members of the shaft; and Fig. 4 is an enlarged perspective view of one of the connecting members.

Like numbers refer to like parts in all of the figures.

1 represents the shaft proper which is inclosed within a flexible tube 2 preferably made of close spirally wound spring wire which is surrounded by a casing 3 preferably of braided fabric. The shaft 1 rotates within the casing and accommodates itself to the various curves in which the casing may be bent.

The shaft 1 comprises link members 4 each of which consists of a body provided at each end with a pair of open jaws 5 each pair being arranged in a plane at right angles to the plane of the other pair. The links 4 are connected in series by connectors 7. These connectors are preferably globular and provided with transversely disposed circumferential grooves 8 which receive the jaws 5 of the link members. The tips 6 of the jaws 5 are slightly contracted or turned inward toward each other to engage the neck at the base of the grooves 8, and retain the jaws in the grooves, the distance between the tips 6 being smaller than the diameter of the neck. In order to assemble or separate these members at pleasure diametrically opposed flat spots 9 are provided at the intersections of the grooves 8 and the diameter of the neck between these spots is thus reduced enough to allow the tips 6 of the jaws 5 to pass over these flat spots. It is necessary, however, to turn each link at right angles to the axis of the shaft while assembling the links to form the shaft and after the shaft has been thus made up and inclosed within the casing, it is impossible to bend the casing to such an angle that the shaft may be disassembled.

It will be noticed that the connection between each pair of links forms a universal joint which may be turned to any convenient angle. The open space between the jaws 5 is elongated, said jaws having opposing parallel surfaces slidably embracing the neck of the coupling member, so that a longitudinal expansibility is thus provided so that when the shaft is bent and thus slightly elongated at the curves this longitudinal expansibility of the shaft will permit it to rotate freely and prevent it from binding.

It will be noticed that this construction provides a very flexible shaft which will run smoothly when bent in a curve of the shortest radius to which an ordinary casing will conform and the shaft after being removed from the casing may be easily taken apart at any point to replace broken or worn members or for other purposes. The casing surrounding the shaft may be filled with lubricating grease to reduce the friction to a minimum if preferred.

What I claim is:—

A flexible shaft comprising link members each composed of a body portion and a pair of jaws at each end of the body portion with each pair of jaws formed alike and arranged at right angles one pair with relation to the other, the inner faces of each pair of jaws being parallel and the extremities of each pair of jaws being turned inwardly and terminating in relatively sharp tips, and ball connectors provided with circumferential grooves arranged at right angles to receive the jaws and having diametrically opposed flattened spots at the intersection of the grooves so that the inturned tips and the opposed parallel surfaces of the jaws may slide on said flattened spots in a direction at right angles to the axis of the shaft and then turned into alinement with the axis of the shaft whereby the links are detachably connected to the ball connectors.

In testimony whereof I affix my signature in presence of two witnesses.

ARTHUR S. REED.

Witnesses:
HAROLD O. VAN ANTWERP,
LUTHER V. MOULTON.